United States Patent
Bartlett et al.

(10) Patent No.: US 10,895,554 B2
(45) Date of Patent: Jan. 19, 2021

(54) FLEXIBLE EDDY CURRENT TEST PROBE USING A SHAPE-MEMORY ALLOY FOR SURFACE CONFORMANCE

(71) Applicant: Southwest Research Institute, San Antonio, TX (US)

(72) Inventors: Jonathan D. Bartlett, San Antonio, TX (US); Albert J. Parvin, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 188 days.

(21) Appl. No.: 16/103,672

(22) Filed: Aug. 14, 2018

(65) Prior Publication Data

US 2020/0057027 A1    Feb. 20, 2020

(51) Int. Cl.
| | | |
|---|---|---|
| *G01N 27/00* | (2006.01) |
| *G01N 27/72* | (2006.01) |
| *G01R 31/02* | (2006.01) |
| *G01R 33/12* | (2006.01) |
| *G01R 35/00* | (2006.01) |
| *G01R 1/04* | (2006.01) |
| *G01R 1/067* | (2006.01) |
| *G01R 1/073* | (2006.01) |
| *G01N 27/90* | (2006.01) |

(52) U.S. Cl.
CPC ................ *G01N 27/9033* (2013.01)

(58) Field of Classification Search
CPC ........ G01N 27/00; G01N 27/72; G01N 27/82; G01N 27/90; G01R 31/02; G01R 33/12; G01R 35/00; G01R 1/04; G01R 1/0408; G01R 1/0416; G01R 1/06; G01R 1/067; G01R 1/07; G01R 1/073; G01M 15/14
See application file for complete search history.

(56) References Cited

U.S. PATENT DOCUMENTS

| | | | | |
|---|---|---|---|---|
| 5,811,970 A * | 9/1998 | Cook | ................. | G01N 27/9006 324/227 |
| 6,577,147 B2* | 6/2003 | Ding | .................. | G01R 31/2886 324/750.28 |
| 2004/0056656 A1* | 3/2004 | McKnight | .......... | G01N 27/9006 324/262 |
| 2005/0007106 A1* | 1/2005 | Goldfine | ............ | G01N 27/9046 324/228 |
| 2013/0199279 A1* | 8/2013 | Boles | ................. | G01N 27/9026 73/112.01 |
| 2016/0025682 A1* | 1/2016 | Walker | ............... | G01N 27/9033 324/222 |

* cited by examiner

Primary Examiner — Neel D Shah
(74) Attorney, Agent, or Firm — Livingston Law Firm

(57) ABSTRACT

A conforming eddy current testing (ECT) probe for performing eddy current testing when placed on the surface of a test object. An eddy current array is fabricated on a flexible substrate. A shape metal alloy (SMA) piece is manufactured to have an original shape that conforms to the surface of the test object, and then affixed to the substrate. The SMA piece has as much or more flexibility than the substrate, so that it can be manipulated into position. Just prior to testing, the SMA piece is actuated to revert to its original shape.

18 Claims, 5 Drawing Sheets

FLEXIBLE EDDY CURRENT TEST PROBE USING A SHAPE-MEMORY ALLOY FOR SURFACE CONFORMANCE

TECHNICAL FIELD OF THE INVENTION

This invention relates to probes for nondestructive testing using eddy current sensors, and more particularly to a probe that uses a shape memory alloy for conforming to a test surface.

BACKGROUND OF THE INVENTION

Non-destructive testing refers to test methods that examine an object, material or system without impairing its usefulness. Non-destructive testing can be concerned with aspects of the uniformity, quality, and serviceability of materials and structures. Many non-destructive testing techniques, such as ultrasonic and eddy-current testing, may be performed without removing a test object from surrounding structures, that is, "in situ". Non-destructive testing techniques are also effective for discovering hidden defects that are not otherwise identifiable through visual inspection.

In many cases, the surfaces of the test object are difficult to inspect with conventional NDT methods due to complex surface geometries of the object and/or restrictive access to the test object inspection surface.

U.S. patent application Ser. No. 14/413,468, entitled "Flexible Eddy Current Probe" describes a probe having eddy current coils configured as spiral traces on a flexible printed circuit board substrate. The probe is especially suitable for being attached to a glove, such that test personnel can use the probe for manual inspection of complex surfaces.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As described in the Background, a flexible probe has been developed that has eddy current coils on a flexible substrate. Such probes are especially useful for glove-mounted manual inspection. That probe is described in U.S. patent application Ser. No. 14/413,468, which is incorporated herein by reference.

The following description is directed to a "conforming" eddy current test (ECT) probe that need not be glove-mounted, but that uses shape memory alloys to allow the probe to be inserted into and then actuated to conform to the surface of a test object. The probe's use of flexible materials allows the probe to be manipulated into difficult to access testing locations. In addition, the probe's use of a shape memory alloy insert or attachment allows the probe to conform to complex surface geometries of a test object.

The probe's ability to take a desired shape after being positioned opens the potential to inspect previously un-inspectable areas. The probe is "self actuating" in the sense that no external motors, gears, or other actuators are needed to cause the probe to take the desired shape.

Figure 1:
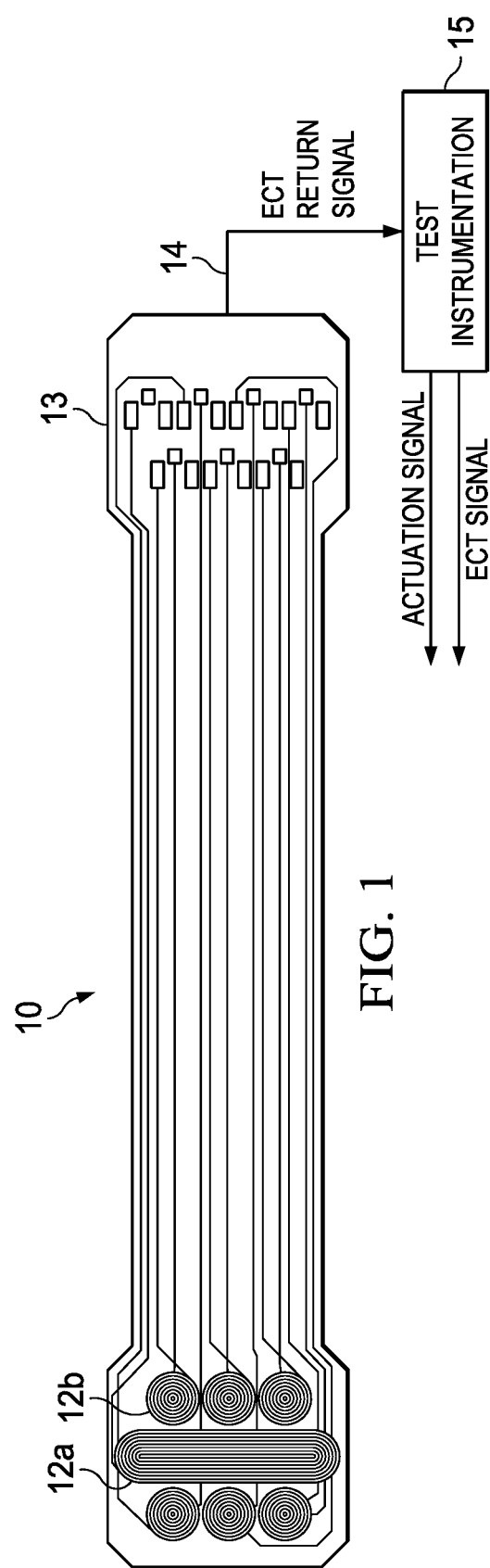
FIGS. 1 and 2 are a top and bottom view, respectively, of an example of a conforming eddy current test probe.
Figure 2:
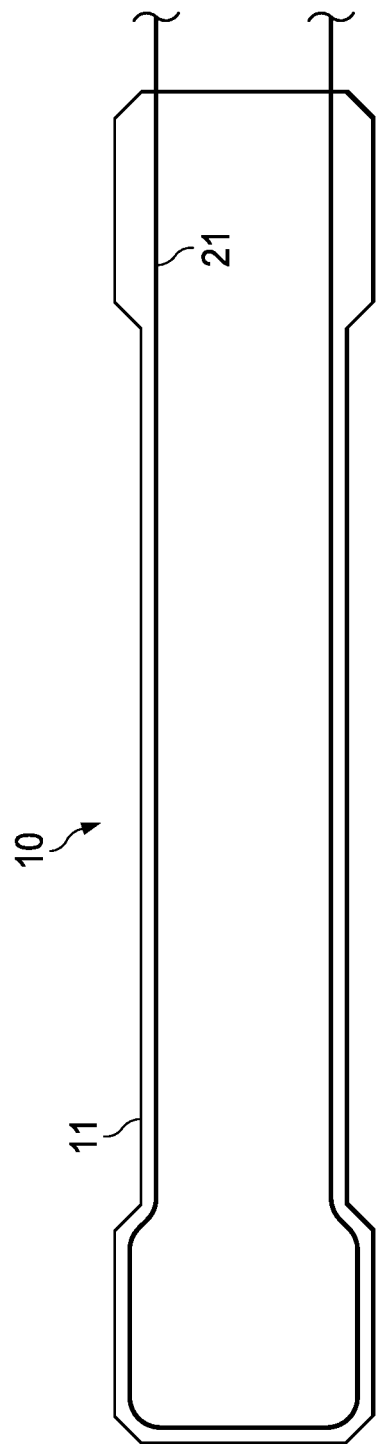

FIGS. 1 and 2 are a top and bottom view, respectively, of a flexible ECT probe 10, having a shape metal alloy wire 21 affixed to the bottom of the probe 10. The probe 10 is shown in an unactuated shape, ready for positioning on the surface of a test object (not shown). As explained below, when positioned and actuated, the probe 10 will take an "original" shape that conforms to the surface of the test object. The probe 10 is then ready for eddy current testing to proceed.

Probe 10 has a flexible substrate 11, upon which a flexible eddy current array 12 is fabricated. An example of a suitable material for substrate 11 is an electrically insulating polymide substrate, such as Kapton. The flexible substrate 11 may be bent, twisted, or otherwise manipulated in any direction.

In the example of FIG. 1, eddy current array 12 has an inner driver (transmit) coil 12a surrounded by six smaller pickup (receive) coils 12b. The coils of eddy current array 12 use thin metal lines, or traces, deposited on substrate 11.

In this configuration of eddy current array 12, all coils are printed on the same side of the substrate 11. However, it should be understood that many different eddy current coil configurations are possible, and that eddy current coils may be printed on either or both sides of substrate 11. Typically, the eddy current array 12 is fabricated at an edge or end of the probe, but other locations are possible.

The eddy current array 12 is capable of receiving an alternating current from a test instrument 15, inducing an eddy current in a test object and sensing a return signal indicative of an electromagnetic feature of the test object. More specifically, during eddy current testing, alternating current injected into a coil creates a magnetic field in a conductive part, or test object, when the coil is placed on or near the test object. Defects in the test object disturb the path of the eddy currents and the disturbance may be measured by the coil through a return signal. The coils may comprise a driver-pickup arrangement wherein a driver coil is excited with an alternating current to generate an eddy current in the test object and a pick-up coil may detect changes in the induced eddy current caused by defects in the test object. In other embodiments, a coil may function as both a driver and a pick-up coil.

When an eddy current array is used, the test instrumentation 15 may simultaneously drive and read multiple eddy current coils placed on the same probe. Data acquisition may be performed by multiplexing the eddy current coils. Each individual coil may produce a signal representative of the structure below it. Data from the return signal may be referenced to an encoded position and time and may be represented by the test instrument graphically as an image. Eddy current array testing provides advantages over single-coil eddy current testing. Eddy current array testing provides a faster scan that allows for test coverage of larger areas in a single probe pass.

The connection end of probe 10 has a number of connectors 13, which provide an electrical connection between the eddy current array 12 and at least one electrical conductor 14. Examples of suitable connectors 13 are U.FL ultra-miniature micro coaxial cable attachments on the substrate surface. The electrical conductors 14 lead to eddy current test instrumentation 15.

Test instrumentation 15 is capable of sending, receiving, interpreting and displaying signals representative of eddy current testing. A commercially available test instrument may provide the ability to electronically drive and read several eddy current sensors positioned side by side in the same probe assembly. In certain embodiments, multiplexing of signals from multiple probes may be used to reduce the number of electronic channels, to utilize multiple frequencies to excite each probe, or to change probe functions, for example, to change a coil's operation from driver to pickup.

Suitable test instrumentation is commercially available, such as the Corestar Omni-200, a remote eddy current test unit that connects to a notebook computer. Smaller and more compact instrumentation may be desired for testing in confined areas.

Referring in particular to the bottom view of FIG. 2, wire 21 is made from a shape metal alloy and is affixed to the bottom surface of the substrate 11. A shape-memory alloy (also sometimes referred to as smart metal, memory metal, memory alloy, muscle wire, smart alloy) is an alloy that "remembers" an original pre-programmed shape. If deformed, a piece of material made from such an alloy will return to its pre-deformed (original) shape when heated, as a result of having a reversible solid-state phase transformation property.

More specifically, when piece of metal made of a shape-memory alloy is in its cold state, the metal piece can be bent or stretched and will hold those shapes until the piece is heated above the transition temperature. Upon heating, the shape of the piece changes to its original shape. When the metal cools again it will remain in the hot shape, until deformed again.

As explained below, the use of a shape metal alloy wire, strip, tube, or other piece or pieces of shape metal alloy material affixed to substrate 11 allows the probe 10 to take on a desired shape during eddy current testing so as to conform to a particular geometry of a test object. The alloy piece(s) is affixed to the probe with a pre-bent (pre-programmed) state. Then, the flexible probe 10 is manipulated into position. After that, the shape metal alloy piece 21 is electrically actuated back to its pre-programmed (original) state to conform to the test surface.

A shape metal alloy that is especially suitable for use with probe 10 is nickel titanium, also referred to as Nitinol. Nitinol is an anisotropic, nonlinear material, with shape properties that can be varied dramatically during the manufacturing process. It can be manufactured to have shape memory and/or super elastic characteristics. The transformation temperature for Nitinol is approximately 40 degrees C., at which it reverts to its "pre-programmed" austenite form. That is, the shape metal alloy piece recovers its "original" shape.

In the example of FIGS. 1 and 2, the scan direction of the probe is lengthwise, along the long axis of the probe 10. However, the probe and its eddy current array can be configured for a scan direction in any direction.

The piece of shape metal alloy, whether it be in the form of a wire 21 in a single loop or some other configuration, is at least as flexible or more so, than substrate 11. The probe may use the super elastic characteristic of shape metal alloys. The super elasticity of shape metal alloys is a mechanical type of shape memory. This effect is observed when alloys are strained just above their transformation temperature, observed by the material taking high deflection or strain, without any permanent deformation to the material.

When a super elastic tuned shape metal alloy piece is attached to the probe, it can be bent, twisted and manipulated to get the probe to its destination. By understanding the part surface-to-be-inspected the final probe shape can be predetermined so that when it reaches its destination, the probe complies with the part surface and is able to conduct scans of the region of interest, possible because the probe does not take on a permanent deformation.

The flexibility of printed circuit board 11, eddy current array 12, and the shape metal alloy 21 allows probe 10 to be manipulated into position at a desired location on or near a test object. As explained in further detail below, probe 10 may be designed for a particular geometry of test object. This geometry will then dictate the eddy current array configuration, the actuation of the probe's shape during testing, and the scan direction. Thus, in general, probe 10 can be manufactured in custom lengths, shapes and with custom eddy current array configurations.

Figure 3:
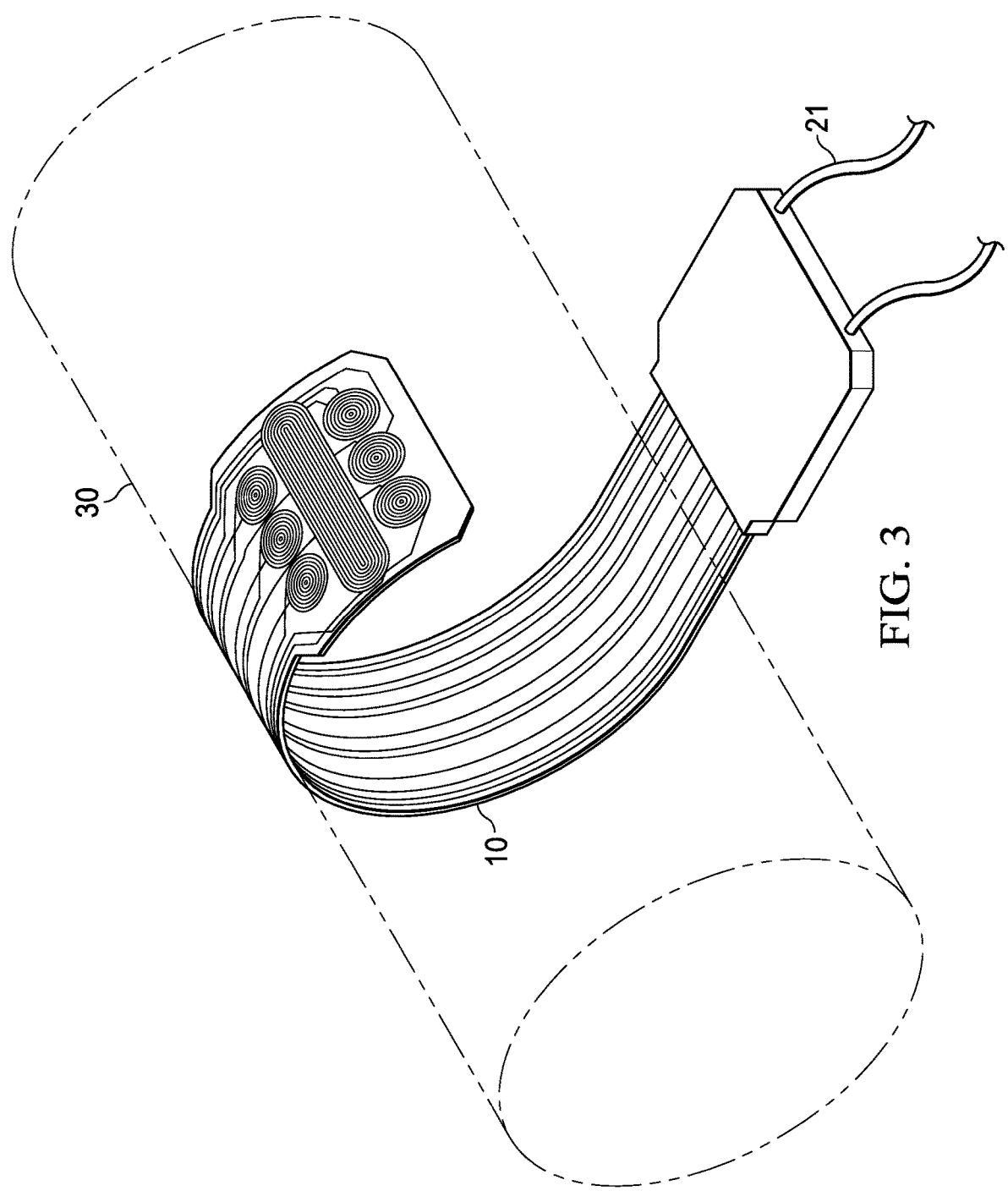
FIG. 3 illustrates the conforming eddy current probe of FIGS. 1 and 2 in an actuated state.

FIG. 3 illustrates probe 10 in its actuated state. When an electric current is passed through wire 21, wire 21 is "actuated" and heats up and reverts to its original shape. Referring again to FIGS. 1 and 2, wires and connectors may be used for this purpose.

In other embodiments of probe 10, wire 21 may be actuated by heat rather than by an electrical current. In these embodiments, probe 10 need not have electrical connectors for actuation. Instead, once probe 10 is positioned for testing, a heat source heats wire 21 causing probe 10 to become actuated.

In the example of FIG. 3, when wire 21 is actuated, it reverts to a curled shape. This shape can conform to a curved surface of a test object 30. In the simple example of FIG. 3, test object 30 is a round pipe or rod, but it can be understood that probe 10 can be made to conform to a wide variety of surface geometries when actuated.

In the example of FIG. 3, probe 10 has an elongated strip configuration and curls along its length. However, the probe can have any planar shape, and its shape metal alloy element can cause the probe to take any desired shape when actuated. The actuated shape may be convex, concave, angular, or any other desired simple or complex geometry. By understanding the part surface-to-be-inspected, the shape of probe 10 can be predetermined so that when actuated through electrification, probe 10 complies to the part surface and is able to conduct scans of the region of interest.

Figure 4:
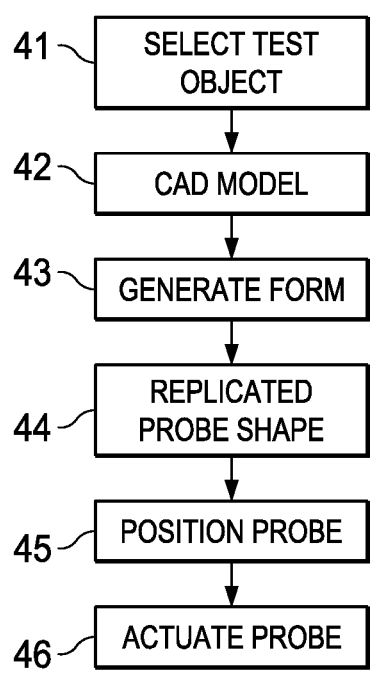
FIG. 4 illustrates a method of eddy current testing using a conforming probe.

FIG. 4 illustrates a method of manufacturing a probe, such as probe 10, to have an actuated shape that will fit a specific geometry of a test object. As explained below, complex surfaces can be replicated from drawings or 3-D models, and a probe shaped to conform to that surface.

In Step 41, a test object is selected for eddy current testing. In Step 42, the surface of the test object is replicated to a CAD model. This can be accomplished by various means such as from drawings or generated part models or by three-dimensional scanning.

In Step 43, the CAD model is used to generate a form representing the test object or a portion of the test object. Three-dimensional printing (also referred to as applied material manufacturing) is especially suitable for this step.

The use of a form ensures consistent surface compliance, reliable scan area coverage, and consistent scans from object to object.

In Step 44, the shape metal alloy piece(s) of the probe is shaped to conform to the form generated in Step 43. This is the "original" shape to which the probe will return after being actuated during use. This "original" shape may be achieved using known shape metal alloy shaping techniques. The shaped pieces are then affixed to the probe.

In Step 45, the probe is positioned into the desired location for eddy current testing. Because the probe is flexible, it may be bent, twisting, or otherwise manipulated to reach difficult to access test surfaces.

In Step 46, once the probe has been positioned into the desired test location, it is actuated through electrification. The actuation heats the shape metal alloy, which causes the shape metal alloy to revert to its original shape, and thus conform to the surface of the test object.

The eddy current test scan may then proceed. The probe, in its original shape and now conforming to the test surface, may be moved to scan a surface of the test object.

For test objects having complex surfaces, more than one SMA piece may be shaped to have different original shapes. One SMA piece may have an original shape in one direction, another in another direction, etc. These SMA pieces can be attached to the same probe. After the probe is positioned into place, the SMA pieces can be actuated simultaneously or in series.

Figure 5:
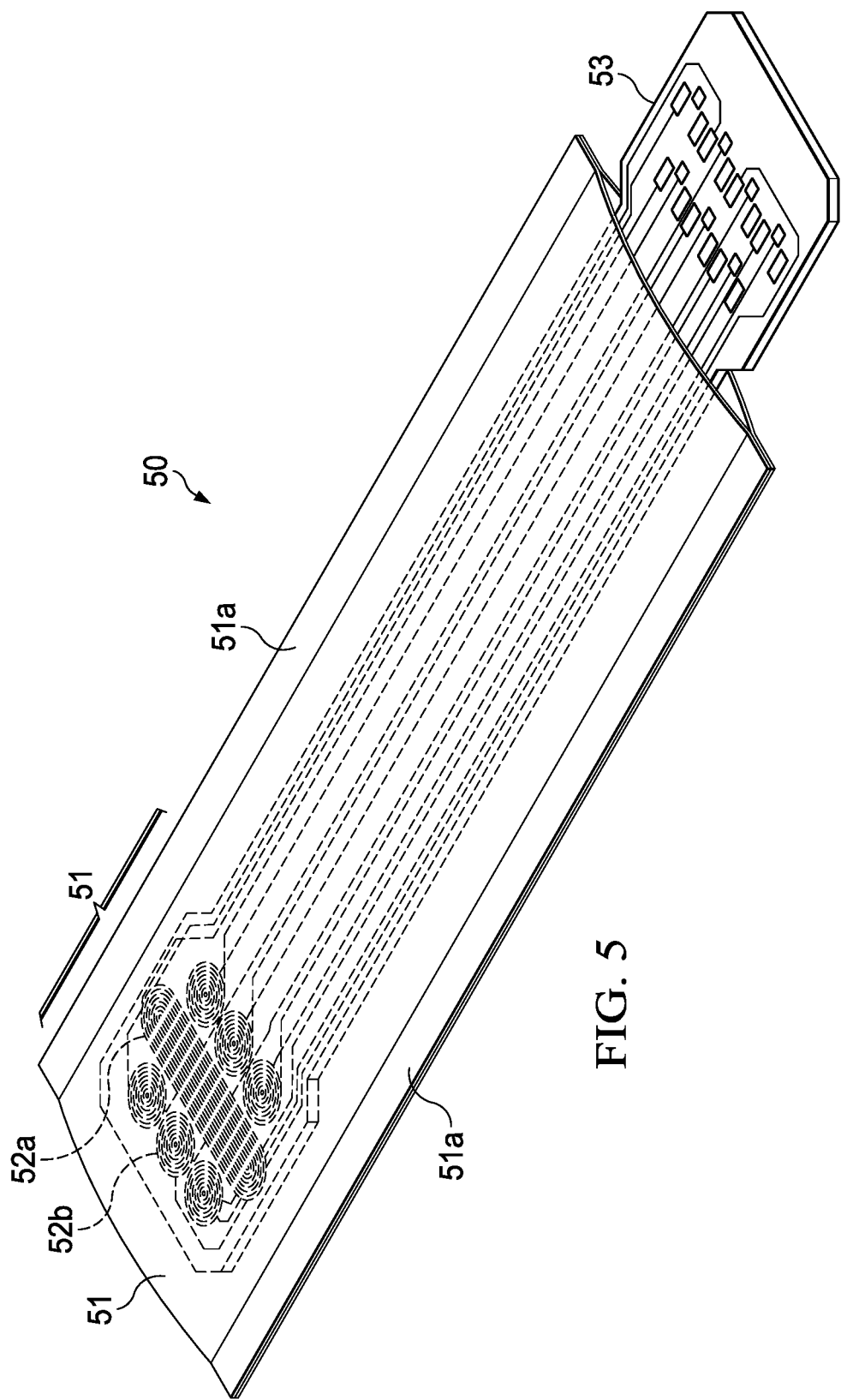
FIG. 5 illustrates a conforming eddy current test probe having a substrate with a pocket for insertion of a shape metal alloy shaping piece.

FIG. 5 illustrates a probe 50 having a flexible and pocketed substrate 51. The pocket receives a piece of shape metal alloy material 53. This is an alternative to attaching the SMA piece(s) to the outer surface of a substrate as in FIGS. 1 and 2. The term "affixed" is used herein to refer to any means of attachment, whether by bonding, insertion into a pocket, or any other means.

The pocketed substrate 51 may be formed with two substrate layers, bonded along their edges 51a to form the pocket. Other configurations, with any number of pockets, in any direction relative to the probe, are possible.

In the example of FIG. 5, the shape metal alloy piece 53 is a rectangular strip that extends the length of the probe 50. The shape metal alloy piece could alternatively have a curved or circular shape. However, in other embodiments, there could be multiple pockets and multiple shape metal alloy pieces. The shape metal alloy can have an original shape that bends in any direction, not necessarily longitudinally. The original shape can be three-dimensional.

Figure 6:
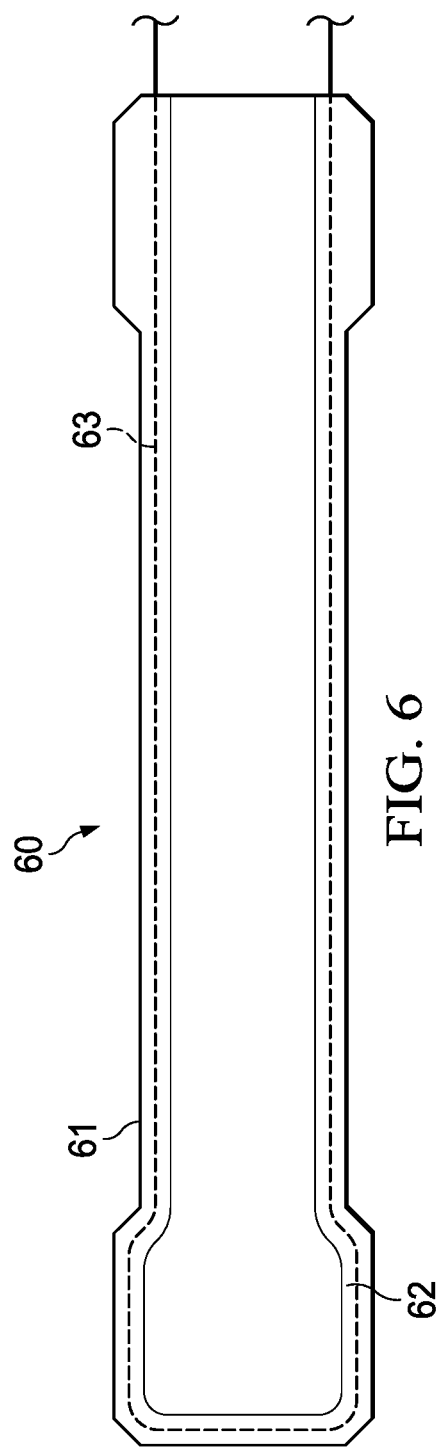
FIG. 6 illustrates a conforming eddy current test probe having a substrate with a pocket around its perimeter for insertion of a shape metal alloy shaping piece.

FIG. 6 illustrates another example of a conforming eddy current test probe having a pocketed substrate for insertion of a shape metal alloy shaping piece. Probe 60 has a pocket 62 around the perimeter of its substrate 61. A shape metal alloy shaping wire 63, much like that of FIG. 2, is inserted into this pocket 62. When actuated, the probe 60 can take a shape similar to that of FIG. 3, or the wire 63 can have some other original shape to which it is actuated.

Figure 7:
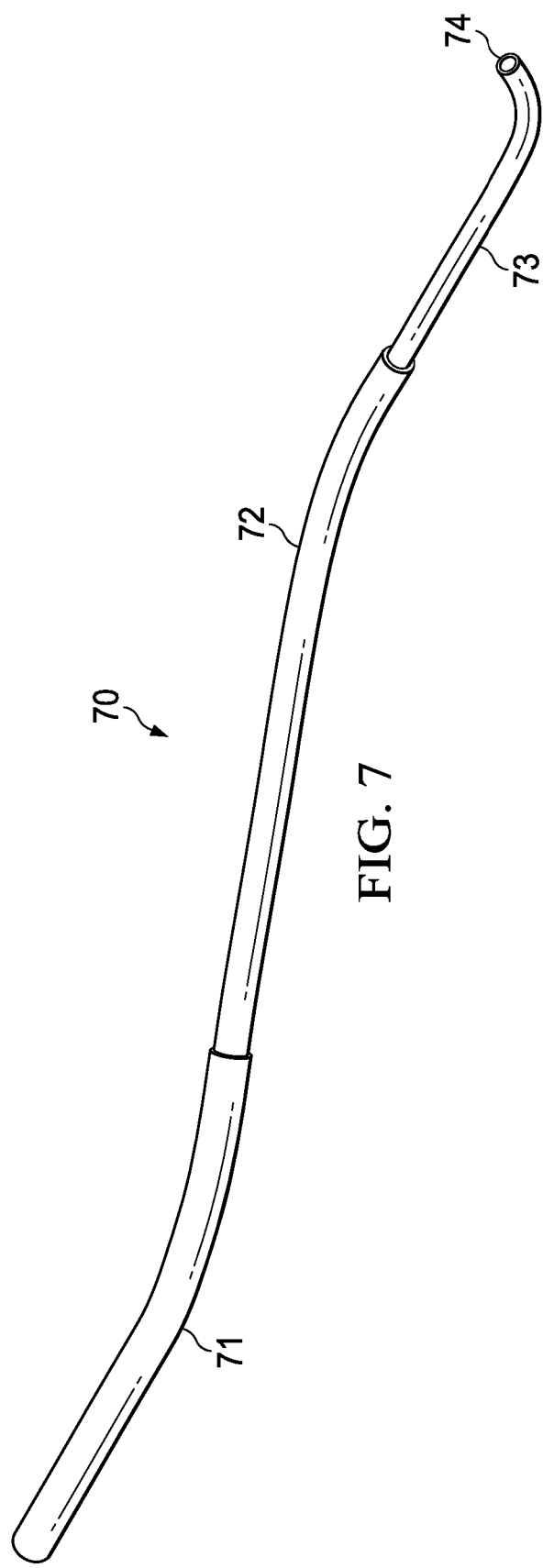
FIG. 7 illustrates a conforming eddy current probe, having shape metal alloy segments.

FIG. 7 illustrates a conforming eddy current probe 70, having shape metal alloy segments. In the example of FIG. 7, probe 70 has three elongated segments 71, 72, 73. Each segment has an original shape, formed as described above. As illustrated, when actuated, each segment has a different rotational direction. The actuated state of the probe 70 conforms to a particular object being tested. Like the probes described above, probe 70 has an eddy current array 74 at one end, with electrical connections (not shown) for testing.

A feature of probe 70 is a telescoping "tube-in-tube" configuration. When probe 70 is being positioned for testing (in its unactuated state), the segments may be telescoped into each other. This aids in placement of the probe. Once positioned for testing, the segments can be translated to the configuration shown in FIG. 7. This translation can be accomplished with various methods, such as manually or by using a motor, hydraulics, pneumatics, or other actuators.

It should be understood that segments such as shown in FIG. 7 are not required for complex actuated states of a probe—a single shape metal alloy piece can be configured and trained for complex surfaces. However, the use of segments may allow a probe that is "collapsible" and capable of being more easily placed into position for testing.

An especially useful application of the probes described herein is in robotic testing. If an inspection area has a known geometry and access path, motion control systems (robotics) can be used to provide highly repeatable inspections.

What is claimed is:

1. A conforming eddy current testing (ECT) probe for performing eddy current testing when placed on the surface of a test object, comprising:
   a flexible substrate;
   an eddy current sensor array fabricated on the flexible substrate; and
   at least one shape metal alloy (SMA) piece affixed to the substrate;
   wherein the SMA piece has at least one deformed shape suitable for affixing the substrate or for placing the probe into position for testing;
   wherein the SMA piece also has an original shape that is different from the at least one deformed shape and that is predetermined to conform to a surface of the test object such that testing occurs while the SMA piece has its original shape;
   wherein the SMA piece has as much or more flexibility than the substrate, and returns to its original shape when actuated.

2. The ECT probe of claim 1, further comprising electrical connectors to the probe for actuating the SMA piece with electrical current.

3. The ECT probe of claim 1, wherein the SMA piece is affixed to the substrate by being attached to an outer surface of the substrate.

4. The ECT probe of claim 1, wherein the SMA piece is affixed to the substrate by being inserted between layers of the substrate.

5. The ECT probe of claim 1, wherein the eddy current array is fabricated at an end or edge of the probe.

6. The ECT probe of claim 1, wherein the SMA piece is in the form of a wire.

7. The ECT probe of claim 1, wherein the SMA piece is in the form of a rectangle.

8. The ECT probe of claim 1, wherein the SMA piece has a three-dimensional original shape.

9. The ECT probe of claim 1, wherein the probe has multiple SMA pieces, each having a different original shape.

10. A method of eddy current testing of a test object, comprising:
    fabricating an eddy current array on a flexible substrate;
    shaping at least one shape metal alloy (SMA) piece by generating a form representing the test object or a portion of the test object and using the form to give the SMA piece an original shape that conforms to the form;
    affixing the at least one SMA piece to the flexible substrate, thereby providing a SMA probe;
    manipulating the SMA probe into place on or near the test object;

wherein the manipulating step is performed by deforming the SMA piece into at least one deformed shape that is different from the original shape, actuating the SMA piece to cause the SMA piece to revert to its original shape;

using electrical connections to the eddy current array and to test instrumentation to perform the eddy current testing while the SMA piece has its original shape.

11. The method of claim 10, wherein the actuating step is performed by using an electrical connection to the SMA piece.

12. The method of claim 10, wherein the actuating step is performed by heating the probe.

13. The method of claim 10, wherein the SMA piece is affixed to the substrate by being attached to an outer surface of the substrate.

14. The method of claim 10, wherein the SMA piece is affixed to the substrate by being inserted between layers of the substrate.

15. The method of claim 10, wherein the SMA piece is in the form of a wire.

16. The method of claim 10, wherein the SMA piece is in the form of a rectangle.

17. The method of claim 10, wherein the SMA piece has a three-dimensional original shape.

18. The method of claim 10, further comprising repeating the shaping and affixing steps for more than one SMA piece.

* * * * *